US007266702B2

(12) United States Patent
Hotti (10) Patent No.: US 7,266,702 B2
(45) Date of Patent: Sep. 4, 2007

(54) METHOD AND SYSTEM FOR MANAGING SECURITY MATERIAL AND SERVICES IN A DISTRIBUTED DATABASE SYSTEM

(75) Inventor: Timo Hotti, Lohja As (FI)

(73) Assignee: Solid Information Technology Oy, Helsinki (FI)

( * ) Notice: Subject to any disclaimer, the term of this patent is extended or adjusted under 35 U.S.C. 154(b) by 863 days.

(21) Appl. No.: 10/274,261

(22) Filed: Oct. 21, 2002

(65) Prior Publication Data
US 2004/0078569 A1 Apr. 22, 2004

(51) Int. Cl.
*G06F 17/30* (2006.01)
*H04K 1/00* (2006.01)
*H04L 9/32* (2006.01)
*H04L 9/00* (2006.01)

(52) U.S. Cl. .......................................... 713/186; 707/9
(58) Field of Classification Search .................... 707/9; 713/186
See application file for complete search history.

(56) References Cited

U.S. PATENT DOCUMENTS

| 5,764,909 A * | 6/1998 | Nishimura .................. 709/223 |
| 5,835,726 A * | 11/1998 | Shwed et al. ............... 709/229 |
| 6,330,562 B1 * | 12/2001 | Boden et al. .................. 726/1 |
| 6,539,483 B1 * | 3/2003 | Harrison et al. ............... 726/1 |
| 6,654,792 B1 * | 11/2003 | Verma et al. ............... 709/208 |
| 6,701,358 B1 * | 3/2004 | Poisson et al. ............. 709/223 |
| 6,839,338 B1 * | 1/2005 | Amara et al. ............... 370/338 |
| 6,957,348 B1 * | 10/2005 | Flowers et al. ............. 713/150 |
| 2001/0019614 A1 | 9/2001 | Madoukh |

FOREIGN PATENT DOCUMENTS

EP 0 860 788 8/1998

OTHER PUBLICATIONS

Menezes et al., "Handbook of Applied Cryptography," 1997, p. 397.*
Abrahams et al., "Unix for the Impatient," 1997, pp. iii and 627.*
Menezes et al., "Handbook of Applied Crytograpy," 1997, p. 397 and 408-409.*

* cited by examiner

*Primary Examiner*—Kambiz Zand
*Assistant Examiner*—Matthew Heneghan
(74) *Attorney, Agent, or Firm*—Young & Thompson (57) ABSTRACT

A method and system for managing security material and security services, and for securely distributing them in a distributed database system where one or multiple distributed applications operate on distributed data. One database hosted by database server contains master version of the security data of databases hosted by database servers. The database hosted by database server has a global view of the security material for managing security of the other databases. A special database is responsible of providing security services to application database of a database server. The system and method control application programs access to data of a database in a database server, and also facilitates the security management issues of complex database topologies, such as multitier hierarchies or multi-master topologies.

31 Claims, 7 Drawing Sheets

METHOD AND SYSTEM FOR MANAGING SECURITY MATERIAL AND SERVICES IN A DISTRIBUTED DATABASE SYSTEM

TECHNICAL FIELD OF THE INVENTION

The invention relates to the field of data security of distributed database systems. Especially the invention relates to a method and system for managing security material in a distributed database system where one or multiple distributed applications operate. The invention also relates to controlling the user access to a distributed database system. The invention also relates to the database servers used for managing security material in a database system.

BACKGROUND OF THE INVENTION

Security management issues are getting more difficult to administer when database systems transform from centralized systems to distributed ones.

For centralized database management systems there are a number of ways security administrators can establish and maintain DBMS (Database Management System) security. These include:
 Manage users, roles, logins, profiles, groups and aliases
 Manage password security
 Grant and revoke roles to/from users
 Grant and revoke system and object-level (such as tables and stored procedures) privileges
 Use DBMS views to limit the rows and columns that users (or groups of users) can access Once authorized to access the database and by using internal DBMS security features, a user's access to the specific tables and columns of data making up the database is secure. However, much of the effort required to translate the security rules and policies placed on the database to a subset of the data (and related schema) on a database is manual and requires lots of resources.

Because of the laborious nature of the security management process, it is a common practice for applications to connect to the database server with a single, global user ID that was defined in the DBMS as having all permission (select, update, and delete) for all objects (tables, views, and stored procedures). In this scenario, the application is responsible for authenticating individual users and enforcing whatever granularity of control is required at the user level. Such an implementation enables "technology adept" users to easily bypass the control provided by the application and access any data desired. Also, this exposes enterprises to the risk that inconsistencies in security could be established for users who access different tools.

Public Key Infrastructures (PKIs), which are prior art for security material management, generally use Secure Socket Layer (SSL) protocol to protect communications in transit between clients and servers. The basic idea of PKIs is to establish trust between parties by issuing certificates that are trusted by both parties. PKIs are used for managing security of client/server and Internet systems. However, the certificates of this kind are laborious to administer when systems grow large and become more complicated. Especially, the systems don't scale up too well because the certificates need to be verified frequently to make sure that the certificate has not been revoked for some reason. This centralized verification service can be a performance bottleneck in a large PKI system.

It is known from US 2001/0,019,614 [1] a dynamic key manager operable to generate an encryption key having an encryption key identification. The system also includes an information database operable to store a data entity encrypted by the encryption key. The information database is further operable to store the encryption key identification in association with the data entity. US 2001/0,019,614 features a dynamic key manager where keys are stored in a separate database which is isolated from the information database. Here, encryption keys are dynamic in that expired keys are replaced as data is retrieved.

When using prior art authentication and authorization solutions in distributed data management systems, problem arises in a scenario where a networked device such as smart phone has a physical database that has been created by the owner of the device. The creator of the physical database in many cases automatically gets the administrator rights to all objects of the database. Later, a new logical database such as a replica database may be created inside this physical database, for example as a database. This replica database may have a partial copy of data of a business application such as "electronic wallet" or "e-wallet." Now, according to solutions of the prior art, the creator of the physical database has full access to the copy of data of a critical application as well as to the synchronization functions of the database. This in many cases is not acceptable from system security viewpoint because the administrator of the local physical database should not have any manual access to the data of the newly created replica database. That database is meant to be remotely managed. Moreover, all access to the replica data should be only through applications that have been approved by the administrator of the distributed system.

The following example illustrates the problem further. In this example, Open Database Connectivity (ODBC) or its java-based equivalence as well as an extension to Structured Query Language (SQL) are used here as an Application Programming Interface (API). In this example Intelligent Transaction [2] based propagation means that a transaction is created in the replica database and it is re-executed later at the master when the databases are synchronized. The current security model for security material management and application access control allows following sequence of actions in the replica database:
1) Login to the replica database server from any ODBC/JDBC capable SQL Editor tool using probably well known userID and password of the local Database Administrator (DBA);
2) Access the data of a catalogue representing a replica database by setting the current catalogue to be a catalogue of the replica database, e.g.
 SET CATALOGUE REPLICA_OF_E_WALLET
3) Create manually an Intelligent Transaction that deposits electronic money to the account of the user. This transaction is later propagated to the master database, e.g.
 SAVE CALL DEPOSIT_MONEY ('123456', 1000000.00)
 COMMIT WORK
4) Next synchronization will now send an unauthorized transaction, i.e. the above intelligent transaction that has been created manually, outside an authorized application, to the master database.

When using the security model of prior art there emerges a risky scenario that the above-mentioned sequence of actions in the replica database easily compromises the data integrity of the master database. In this particular example, a user may be able to deposit electronic money for himself without proper authentication and authorization, only because the user has administrator rights to the database server managing the replica database of the e-wallet system. This problem is the consequence of accepting transactions from unauthorized sources, e.g. applications such as SQL Editor (Structured Query Language Editor) which may have access to the database and perform manual data manipulation operations on the data of the database.

At the same time there arises another problem how to manage the security material such as public and private keys of the entire database topology of the system, especially in case of complex synchronization topologies in question. These complex database topologies can be for example multi-tier hierarchies and multi-master topologies. Multi-tier database hierarchy has more than two tiers of databases. For example, in a distributed sales support system, the topmost master database may have regional replicas and each regional replica may have multiple replicas of its own, e.g. one in each workstation of members of mobile sales force. In multi-master topology, one database server can contain replica databases of multiple master databases. For example, a database server of a smart phone may have a replica database of a streaming content database and a mobile sales support system. Each of these databases require their own security material that has to be managed in coordination with other, related databases. For example, to facilitate encrypted communication between a master and replica database, public encryption key of the master database needs to be delivered to the replica database and vice versa.

Figure 1:
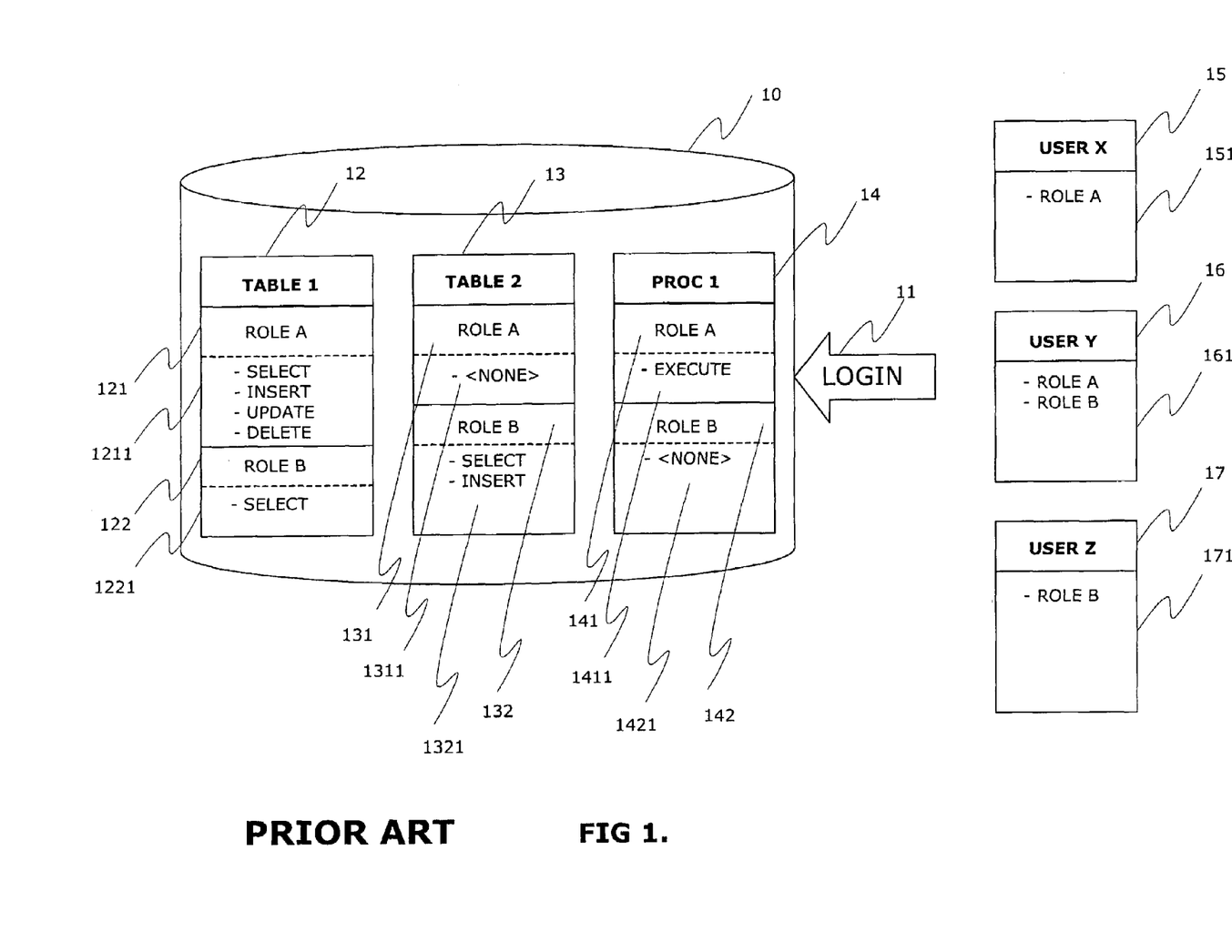
FIG. 1 shows a block diagram of an exemplary database authentication and authorization system according to prior art.

FIG. 1 illustrates the standard User-ID-based relational database authentication and authorization scheme according to prior art. In that scheme, each user 15, 16, 17 can be assigned one or multiple roles 151, 161, 171. Each role 121, 122, 131, 132, 141, 142 can be granted access rights to various operations 1211, 1221,1311, 1321, 1411, 1421 on the database objects 12, 13, 14 (e.g. tables) of the database. The operations on a table 12, 13 can be Select (read data from the table)
Insert (add a new row to the table)
Update (modify a row in the table)
Delete (remove a row from the table)
Stored Procedures 14 of the database may be granted Execute rights.

The access to the database objects (i.e. authorization) is determined upon authentication, i.e. when the user logs 11 on to the database server 10.

The main problem in this kind of authentication and authorization method is that if there are multiple applications accessing different tables in the same database, separate userID and password for login is needed for each kind of application. Managing these userID can get very complex, if the system consists of large number of applications and databases.

Additionally, authorization at database object level is often not practical. If the user manages to log on to the database using e.g. a general purpose SQL editor that allows manual read and write access to the data, the user may be able to generate transactions that are not valid ones even if strict table-level access control is in use. To prevent such logons and creation of manual transaction, the userID and password must be hidden inside the business applications that are authorized to access the data. This constitutes a security risk because often the hidden userID and password are relatively easy to extract from the application program.

SUMMARY OF THE INVENTION

An object of the invention is to introduce a method and system for managing security material and security services in a distributed database system where one or multiple distributed applications operate on distributed data. Another object of the invention is to introduce a method and system for securely distributing security material and application identification material of one or multiple application database hierarchies. This facilitates the security management issues of complex database distribution topologies, such as multi-tier database hierarchies or multi-master topologies.

A further object of the invention is to introduce a method and system for controlling application programs to access data of a database in a database server. According to the invention it is possible to define, in a flexible manner, which application programs are authorized to access the data of a database. An authorized application program has a full access to its database(s) whereas unauthorized application program has no access according to the invention, regardless of the user ID and password used for logging on to the server.

The objects of the invention are obtained by outsourcing the security management functionality, possibly along with other system management functionality to be performed by a distributed database system external to the distributed database system of the application programs whose security is being managed. According to the invention a separate hierarchy of database nodes is responsible of managing the security material and possibly other configuration data of the application databases. According to the invention there is at least one database node that sees at least part of the application database topology of the system and manages the security material of these database nodes, i.e. one database node has a global view of at least part of the security material in the database system.

In addition, the objects of the invention are obtained by arranging a mechanism for checking the validity and authorization of application programs wanting to access data of a database in a database server. To avoid unauthorized operations in the database system a two-phase access control is introduced which enhances the trustworthiness of a database system and simplifies the user access management of a distributed database system, especially in case of complex database topologies.

An essential idea of the invention is to introduce two components to resolve security management issues of complex database topologies. One of the components is a hierarchy of "Security Manager" (SM) master and replica databases for managing security material of a distributed database system and the other is "application fingerprints" for authenticating application programs who want to access data of a database.

In this document a term "authenticate" signifies to become convinced of it that an object, e.g. an application requesting access to a database, is the object which one it asserts to be. A term "authorize" signifies to grant access rights e.g. to an open database, to the object that has been authenticated.

In accordance with the present invention there is provided a method for managing security material in a database system comprising at least one first database, at least one second database, and at least one third database, which method comprises steps wherein;

said first database stores security material to be used in the database system, said security material is distributed from said first database to said third database, and said third database uses said security material to do one of the following: to authenticate at least one application program and to authorize said at least one application program to access said second database in the database system.

The invention also relates to a system for managing security material in a database system comprising at least one first database, at least one second database, and at least one third database, wherein;
   said first database is arranged to store security material to be used in the database system,
   said security material is arranged to be distributed from said first database to said third database, and
   said third database is arranged to use said security material to do one of the following: to authenticate at least one application program and to authorize said at least one application program to access said second database in the database system.

The invention also relates to a first database server for managing security material in a database system, the first database server comprising at least one first database, where said first database is in data connection with at least one second database server comprising at least one second database in a database system, wherein;
   said first database is arranged to store security material to be used in the database system,
   said security material is arranged to be synchronized between said first database server and said second database server, and
   said second database server is arranged to use said security material to do one of the following: to authenticate at least one application program and to authorize said at least one application program to access said second database in the database system.

And, the invention also relates to a second database server for managing security material in a database system, the second database server comprising at least one second database and at least one third database, where at least one third database is in data connection with at least one first database server comprising at least one first database, wherein;
   said second database is arranged to use security material created by said first database,
   said security material relating to said second database is arranged to be synchronized between said first database and said third database, and
   said third database is arranged to do one of the following: to authenticate at least one application program and to authorize said application program to access said second database in the database system, on the basis of the said security material.

According to an embodiment of the invention said first database, where the security material is initially stored, provides a global view of at least some of said security material in a database system. This means that the first database node sees at least part of the entire database topology of the managed distributed system and manages the security material of some or all of the database nodes of the database system hierarchy. According to the invention said security material comprises at least some material that relates to managing the security and possibly other configuration of at least one said second database in the database system. According to the invention said security material comprises at least some material that relates to authenticating an application program and authorizing the application program to access data of at least one said database in the database system. According to one embodiment of the invention said security material may be frequently changeable.

According to another embodiment of the invention said security material is defined and stored in said first database, said security material is distributed from said first database to said third database, said third database uses said security material for authenticating and authorizing at least one application program wanting to access data of a specified second database. According to another embodiment of the invention said security material that is stored in the said first database comprises information that is derived from the identity information embedded in the application program. According to another embodiment of the invention said security material may be encrypted.

According to still another embodiment of the invention at least one application program of said second database, said application program comprising at least one application identity information, requests to access at least one said second database, at least one said third database receives the request, at least one said third database sends at least one challenge to said application program of said second database, the said application program composes a response to the challenge based on said application identity information and an access to at least one said second database is granted or revoked by said third database on the basis of the response of said application program to said challenge.

According to still another embodiment of the invention a client application's access to said second database is authorized by distributing said security material to said third database from said first database, said client application logging in to the server managing the data of said second database using user ID and password, determining said security material for said second database in said third database, sending a request from said client application to said third database directly or via said second database to access application data of said second database, receiving said request from said client application in said third database and sending at least one challenge relating to said security material to said client application from said third database, said client application responding to said challenge sent from said third database based on said client application's identity information, approving the request from said client application by said third database and opening said second database, and allowing said client application to access to said application data of said second database.

According to the present invention said second database and said third database reside in different database servers in the database system. According to one embodiment of the present invention said second database and said third database reside in the same database servers in the database system.

The best mode of the invention is managing security material of a distributed database system in a Security Manager master database and distributing the security material to Security Manager replica databases who based on the security material control access to application master and replica databases by presenting challenges to applications who want to access the data of the application databases. Some embodiments of the invention are described in the dependent claims.

BRIEF DESCRIPTION OF THE DRAWINGS

Next the invention is described in greater detail with reference to exemplary embodiments in accordance with the accompanying figures, in which.

GENERAL NOTIONS USED IN THIS APPLICATION

The following notions are used in this application:

"Database management system" is an entity, which comprises one or more databases and/or database management systems, whereby the system is responsible for reading the data structures contained in the databases and/or data management systems and for changing these data structures. Database management systems are also called database servers.

"Data element" is an information structure, which can comprise other data elements or such data elements, which can be construed as atomic data elements. For instance, in a relational database data elements are represented by tables comprising rows. The rows comprise columns, which are typically atomic data elements.

"Database" is an information structure, which comprises one or more data elements, and the use of which is controlled by the data management system. The invention is applicable both in relational databases and in databases of other forms, such as in object oriented databases. In a distributed system, a database may have a role of a master or replica database or both.

"Database Server" is a software process that implements the functionality of a database management system. It manages the data of at least one database and through which client applications can access and modify the data of the databases.

"Database operation" is an event, during which data elements are read from the database, during which data elements of the database are modified, during which data elements are removed from the database, or during which data elements are added to the database.

"Database Catalogue" is in some commercial products a database within a data management system. A data management system can manage data of multiple database catalogues.

"Database Schema" is the structure of a database, described in a formal language supported by the database management system (DBMS). In a relational database, the schema for example defines the tables, the columns in each table, and the relationships between tables.

"Master database" is a database in a database synchronization system that contains the official version of distributed data. The master database can have multiple replica databases in the network.

"Replica database" is a database in a database synchronization system that contains a full or partial copy of the master data.

"Security material" is data that is used for access control, authentication, authorization, signing or encryption purposes in the computer system. Examples about security material are user IDs and passwords, symmetric encryption keys and public and private keys of public key cryptography.

"Synchronization" is the operation between replica and master databases in which changed data is exchanged between the databases. In one known embodiment, this means propagation of Intelligent Transactions from replica to master and subscribing to at least one publication to download changed data from master to replica [2].

"Push synchronization" is synchronization between replica and master databases initiated by the master database server.

"Publication" is a set of data in a database catalogue that has been published in master database for synchronization to one or multiple replica databases. A publication can contain parameters that are used to filter data of the publication.

"Transaction" is a plurality of database operations acting on the data pieces or elements. A transaction is an atomic operation that is completed or discarded as a whole. A transaction can also comprise further transactions. A transaction may also be for example a financial transaction.

DETAILED DESCRIPTION

Figure 2:
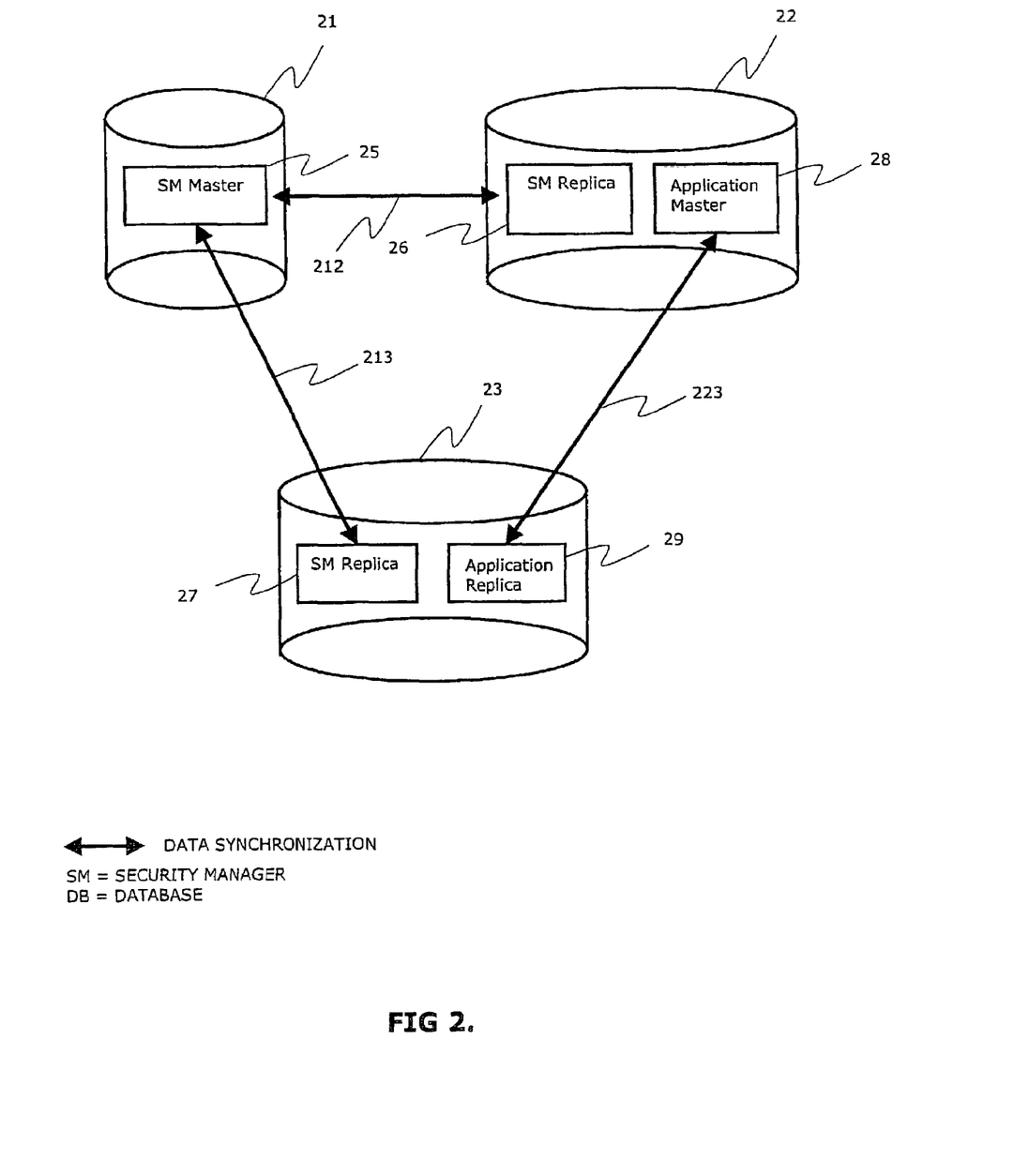
FIG. 2 shows a block diagram of an exemplary database system according to the present invention.

FIG. 1 is described earlier in this description in association with prior art. FIG. 2 illustrates an exemplary of a database system according to the invention. Database servers 21, 22 and 23 are organized to a multi-master topology, where application databases make one database hierarchy and a separate database hierarchy is used to manage and securely distribute security material for the application databases. One database server 21 contains security material data of one or multiple application programs accessing data from the databases of database servers 22 and 23. According to the invention the database server 21 has a global view of at least some of the security material providing security services for one or multiple distributed databases.

The system illustrated in FIG. 2 may contain multiple database servers which are communicable linked to each other to enable synchronization of data with one or multiple other database servers. The master databases 25, 28 and replica databases 26, 27, 29 can be connected to each other by any known suitable data transfer systems 212, 213, 223, such as cable, a wireless system, through the Internet or other communication systems or by any combination of these.

As security material may be used keys, hashes, digital signatures, usenames, passwords, application fingerprints, etc. An application fingerprint in this document is a general name for information that is derived from the content, capabilities or properties of an application program. An application fingerprint may for example be an electronically signed hash value of an application program file or part of the file. Also for example the size of the application program file may be considered as an application fingerprint. As yet an other example, an application fingerprint may be application's capability to correctly perform a certain function upon request.

To manage and distribute security material in a complex database system a special database type, a Security Manager (SM) is introduced. The Security Manager is responsible of providing security services such as security material management and distribution to one or multiple application databases of a database server. Recommended security material relating to the Security Manager are e.g. the Security Manager signing key pair for each master and replica nodes and fingerprints of applications who are authorized to access the managed application databases. In FIG. 2 Security Manager master database 25 of server 21 that has a global view to security material of the entire database system is the master location of the security material of the managed application databases 22, 23. Security Manager replica database 26 in server 22 holds a copy of the security material of the application database 28 whose security it manages. Security Manager replica database 27 in server 23 holds a copy of the security material of the application database 29 whose security it manages. Application master database 28 is a master database node of the application database hierarchy. For security services including authentication and authorization, it accesses the Security Manager replica 26 assigned to it. Application replica database 29 is a replica node of the application database hierarchy. For security services, it accesses the Security Manager replica 27 assigned to it. It should be noted that the Security Manager database assigned to an application database may not always reside in the same database server.

A server can host multiple Security Manager master or replica databases. One Security Manager can provide security services to one or multiple application databases. The role of the Security Manager can be assigned also directly to an application database. This way, a separate Security Manager database hierarchy is not needed if the manager is used only by one system that has a simple, e.g. two-tier database hierarchy.

Successful login to the server is not considered as a sufficient method of authentication because e.g. in mobile wireless terminals the administrator user-ID and password of the terminal's database server may be of common knowledge. Moreover, the administrator of the wireless terminal's database server often should not have manual access to the application replica databases that are managed by the server. Hence, a second phase of authentication and authorization is needed to ensure that only approved applications are accessing the data of application databases. For this purpose, the Security Manager acts as a gatekeeper that control applications' access to the databases. An application can access database objects of a database only if it can convince the Security Manager that it is a legitimate application that does not contain any malicious code. In other words, the application must be one that is trusted by the Security Manager. The security material managed by the Security Manager databases may be changed frequently. In other words, there maybe any number of application fingerprints for an application. The Security Manager may use any of the fingerprints to present the challenge to the client application.

Figure 3:
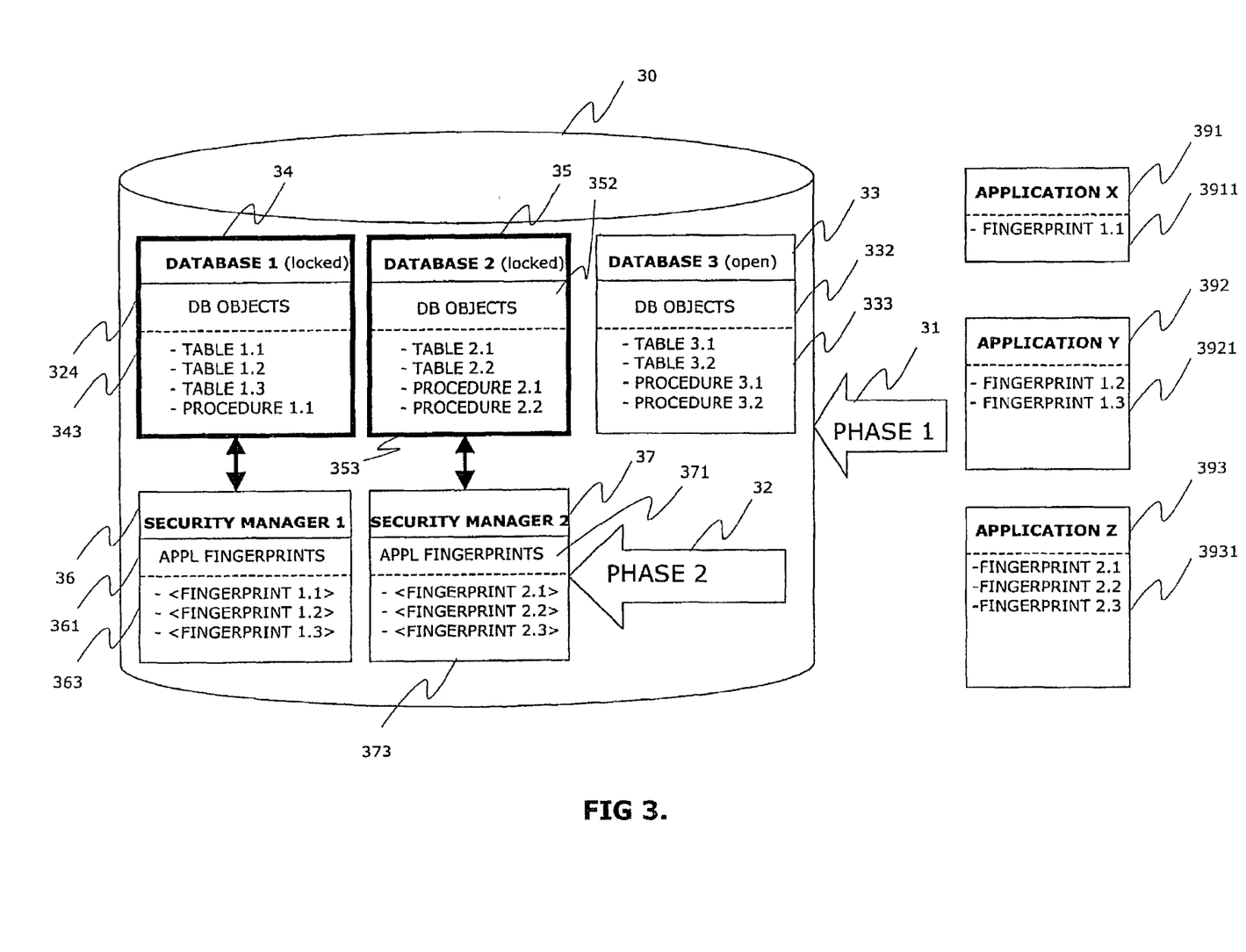
FIG. 3 shows a block diagram of a two-phase authentication arrangement according to the present invention.

FIG. 3 shows the two-phase authentication and authorization according to the present invention. Lets assume a database system where a database server 30 comprises locked databases 34, 35 and unlocked database 33, and client applications 391, 392, 393 communicating with the database server. A first phase 31 (login with User-ID and password) is similar to the prior art. At successful login, a connection between the client application and the database server is established and user has access to all database objects 332 and contents 333 of unlocked database 33 according to the access rights granted to this user. In many cases, the User-ID is that of the database administrator, which gives the user full access to all database objects 332 and contents 333 of the unlocked database 33.

A second phase 32 of authentication and authorization system according to the present invention is described next. In order to gain access to a locked database 34, 35 in the database server 30, the client application 391, 392, 393 requests server that a database should be opened. Upon this request, the server returns a challenge to the client application. The challenge is derived from an application fingerprint 3911, 3921, 3931. The collection of application fingerprints 361, 371 resides in the security manager database 36, 37 of the locked application database 34, 35. For example, the fingerprint collection 363, 373 may contain a public signing key that is used to verify the digital signature of an application. The Security Manager 36, 37 opens the database 34, 35 for the application only if the response to the challenge is a correct one, e.g. the verification of the signature is successful.

Typically the Security Manager database 36, 37 is a replica database that contains a subset of data from the respective Security Manager master database.

In addition to public keys that are used for verifying signatures created with private keys, there may also be other kinds of fingerprints that may or may not be based on public key cryptography.

Per authorized application, there may be any number of application fingerprints 363, 373. New fingerprints may be downloaded to the Security Manager replica database 36, 37 from the master database of the Security Manager (shown in FIG. 2). In other words, the application must be able to respond multiple different challenges. Failure to respond a challenge correctly may result as a security alert in the system that is propagated to the master database of the Security Manager. Even if an unauthorized user were able to forge some of the application's fingerprints and thus gain access to the locked database, there is still a significant risk of being caught because new fingerprints of which the unauthorized user has no advance knowledge, may be downloaded to the Security Manager replica database from the master and used for authentication any time.

The fingerprints may be encrypted in the Security Manager database using e.g. the root key of the database server. The root key is a key that is either obfuscated in the server's program code or in database file or it is stored in a separate tamper-resistant hardware device, for example.

Figure 4:
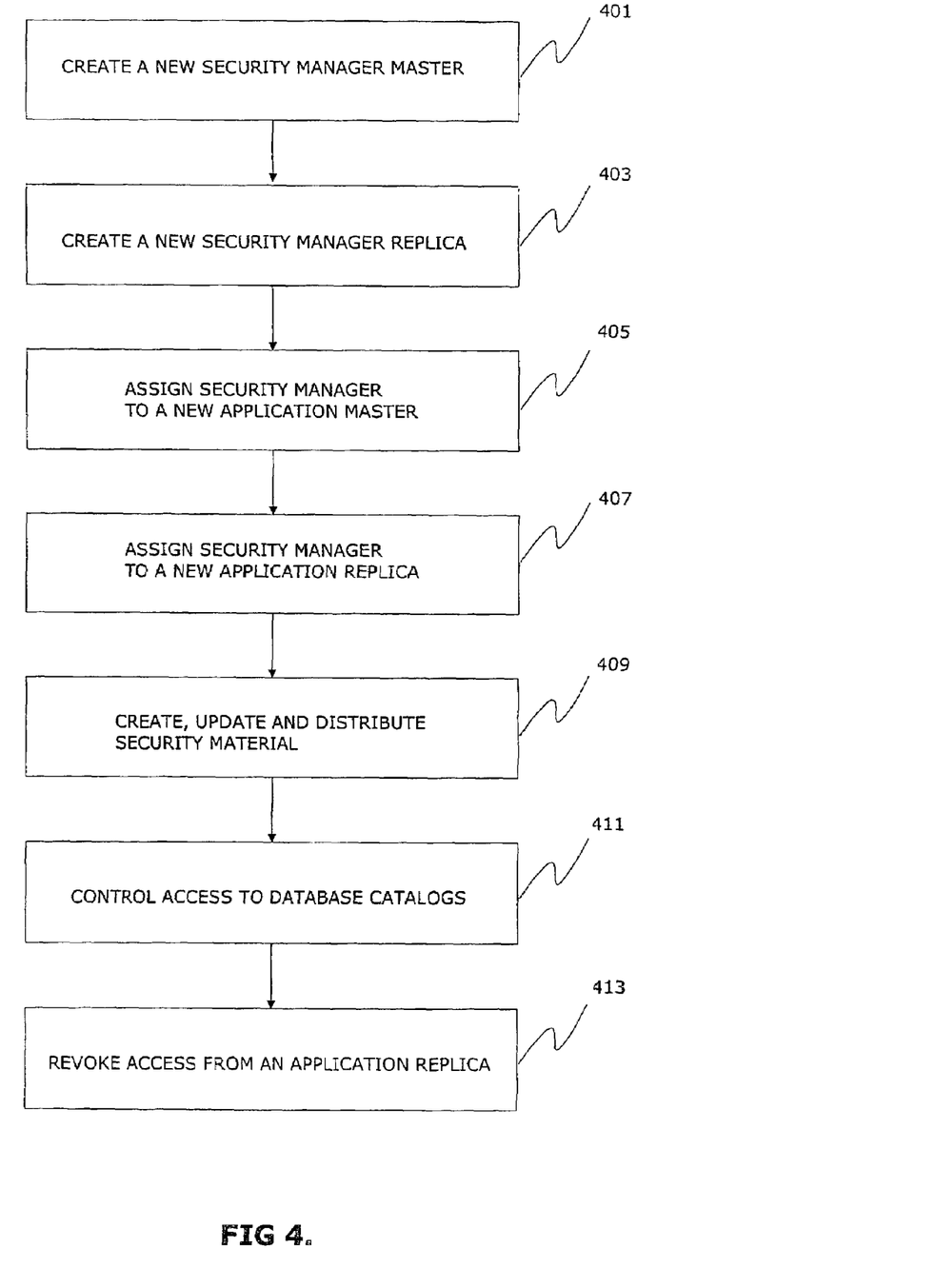
FIG. 4 shows a flow diagram of a method for security management functionality according to one embodiment of the invention.

FIG. 4 shows exemplary steps of the security management functionality provided by the Security Manager. In the following is also referred to FIG. 2. In step 401 a new Security Manager master database 25 is created. A Master Database Administrator (MDA) of the database server 21 installs the database server software on the computer node 21 and creates a database 25 on the database server 21. After this MDA inputs data that defines which users may create and register replica databases and which username/password pairs may be exported to replica databases.

In step 403 according to FIG. 4 a new Security Manager replica database 27 is created in another computer 23 and it is registered with the Security Manager master database 25 using user-ID, password and other security material such as keys provided by Security Manager master database. Security Manager replica 27 database may now synchronize data with Security Manager master 25 database.

In the following step 405 of FIG. 4 a new application master database 28 is created and the Security Manager replica is assigned to a new application master database 28. Lets presume that the application A, including the application A master schema, application A replica database schema definition and application A fingerprint, is created by application developers. The application A also includes some application identity material, which is built into the application by the application developers. The application fingerprints are derived from the application identity material. Then MDA of the Security Manager 25 selects the database server 22 as the entity who may create the application A master database. MDA of Security Manager database 25 instructs it to allow LDA of the server 22 (associated to application database master 28) to create the application A master database and associate it with the security manager replica 26. LDA of the server 22 (user of the server 22) installs application A on the node 22. Next the database 22 server creates the application A master database 28, and finally LDA of the server 22 requests that the application A creates the application A master schema into the application A master database 28 by communicating with the database server 22.

In step 407 of FIG. 4 a new application replica database 29 is created. Prior to creating the application replica database, a Security Manager must be assigned or created to the database server 23 or alternatively to another server (not shown in picture) using step 403. LDA of the server 22 registers LDA of the server 23 as a user in the application A master database 28 in the server 22 by disclosing a username/password combination from the server 22 that is then made available to LDA of the server 23. The same master user username/password can be used by users of multiple replica databases. LDA of the server 22 instructs the server to allow user of the server 23 to create the application A replica database 29. This information is written to the Security Manager replica 26 of the server 22. The Security Manager replica 26 database is synchronized with the Security Manager master database 25 and this includes a new information about user of the server 23 being allowed to create the application A replica database 29. This information is further synchronized from the Security Manager master database 25 to the Security Manager replica database 27. Then LDA of the server 23 installs the application A on the server computer 23 or on another computer that is in data connection with server computer 23 and establishes a connection to the database server 23. LDA of the server 23 creates the application A replica database 29 and assigns the Security Manager 27 for the application A replica database 29. Then the Security Manager 27 closes the application A replica database 29. Then the application A opens the application A replica database 29 using steps described in FIG. 3. Then LDA of the database server 23 instructs the application A to create the application A replica schema into the application A replica database 29 by communicating with the database server 23. Finally, the application A replica database 29 is registered with the application A master database 28. After successful registration, the application replica database 29 may synchronize data with the application master database 28.

In step 409 of FIG. 4 the Security Manager master database 25 synchronizes data with the Security Manager replica database 26 or 28. In general, this is used for creating, updating and distributing the security material such as application fingerprints and encryption keys for database servers. Whenever new security material is created in the Security Manager master node or in any of the Security Manager replicas or existing material is modified or deleted, the changes need to be distributed to the affected Security Manager replica databases using data synchronization or other data distribution techniques.

In step 411 of FIG. 4 accessing data of the application replica 29 is controlled. The application A attempts to access the application A replica database 29. This step is explained in more detail later on in connection with the description of one embodiment of the invention in accordance with FIG. 6.

In final step 413 of FIG. 4 the access from a replica database 29 is revoked. In this procedure the administrator of the application master database 28 asks its Security Manager replica 26 database to revoke/suspend access from applications accessing application replica database 29. Then the Security Manager replica 26 suspends or deletes the security material necessary of opening the specified application replica database 29 and finally the key deletion is propagated to the Security Manager master 25 who push-synchronizes the security material revocation to the Security Manager replica database 27. Now that the security material for database 29 is missing from the Security Manager, any attempt to open the application replica database fails with an error.

In order to establish trust between the database server and application program, the Security Manager needs to have some information of the application programs that are authorized to access a database, in other words, the Security Manager needs to know some kind of application fingerprints of these application programs. The fingerprint can be e.g. a signed hash value of the application binary code or any other difficult-to-falsify information that is embedded in the authorized application. Each authorized application may also have multiple fingerprints. The fingerprints may be stored encrypted in the Security Manager databases. The fingerprints can also be changed periodically to further prevent from forging the authorized application programs and to increase the risk of detecting the forged applications.

Figure 5:
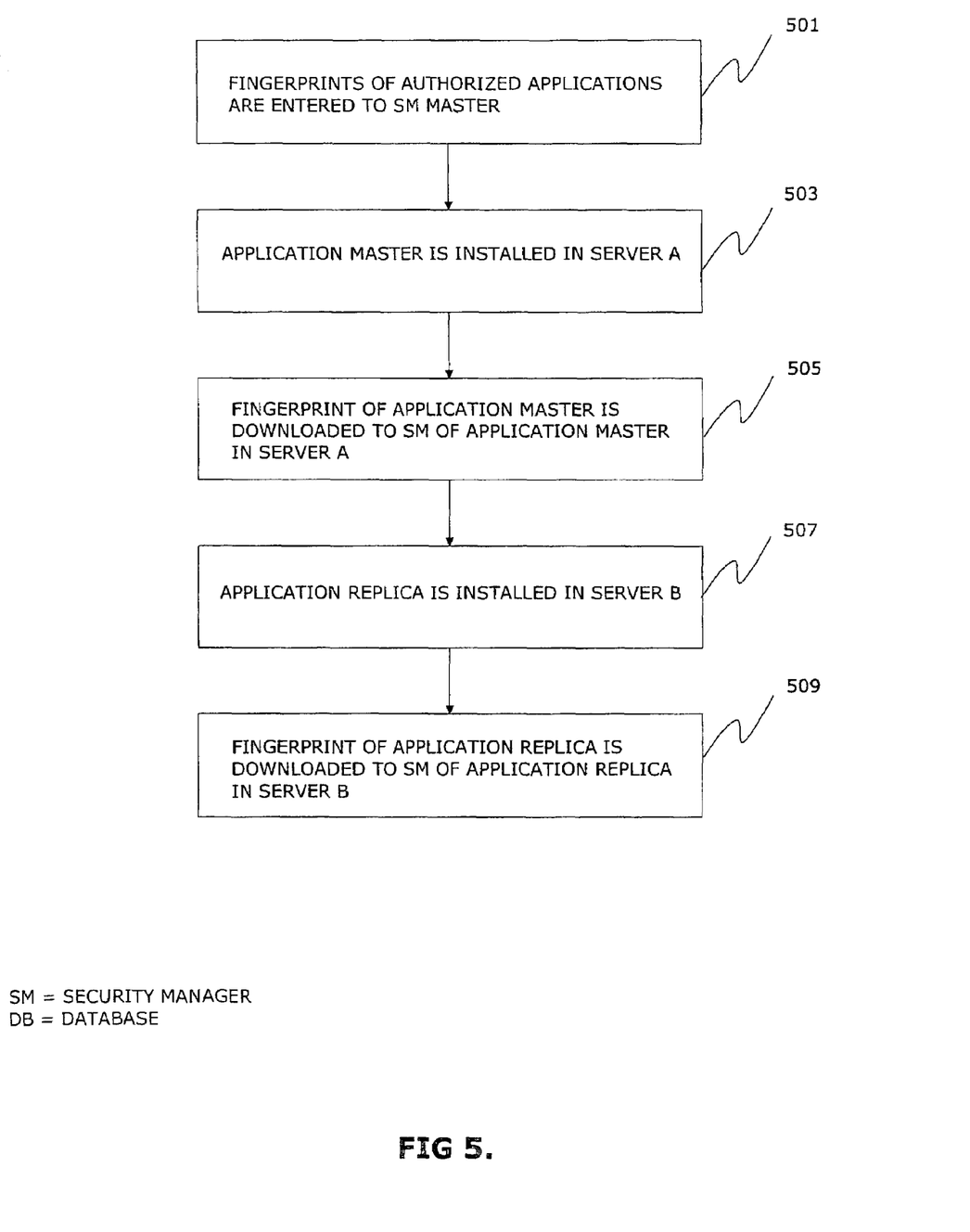
FIG. 5 shows a flow diagram of a method for security management functionality according to another embodiment of the invention.

FIG. 5 shows a flow diagram of a method how an application fingerprint material is entered to the database system and distributed to the Security Manager replica databases according to one embodiment of the invention. In FIG. 5 (with reference to FIG. 2 as well) in step 501 the security management application (not shown) enters the application fingerprints of authorized applications to the Security Manager master 25. Then in step 503 the application master database 28 and related application is installed into the server 22. Then in step 505 the fingerprint of the application master 28 application is downloaded using synchronization to the Security Manager replica 26 of the application master 28 in the server 22. Step 507 of the flow diagram shows how the application replica database 29 and related application is installed in the server 23. Finally, in step 509 the fingerprint of the application replica 29 application is downloaded using synchronization to the Security Manager replica 27 of the application replica 29 in the server 23. Step 505 may also occur before step 503 and step 509 may occur before step 507 according to one embodiment of the present invention.

Figure 6:
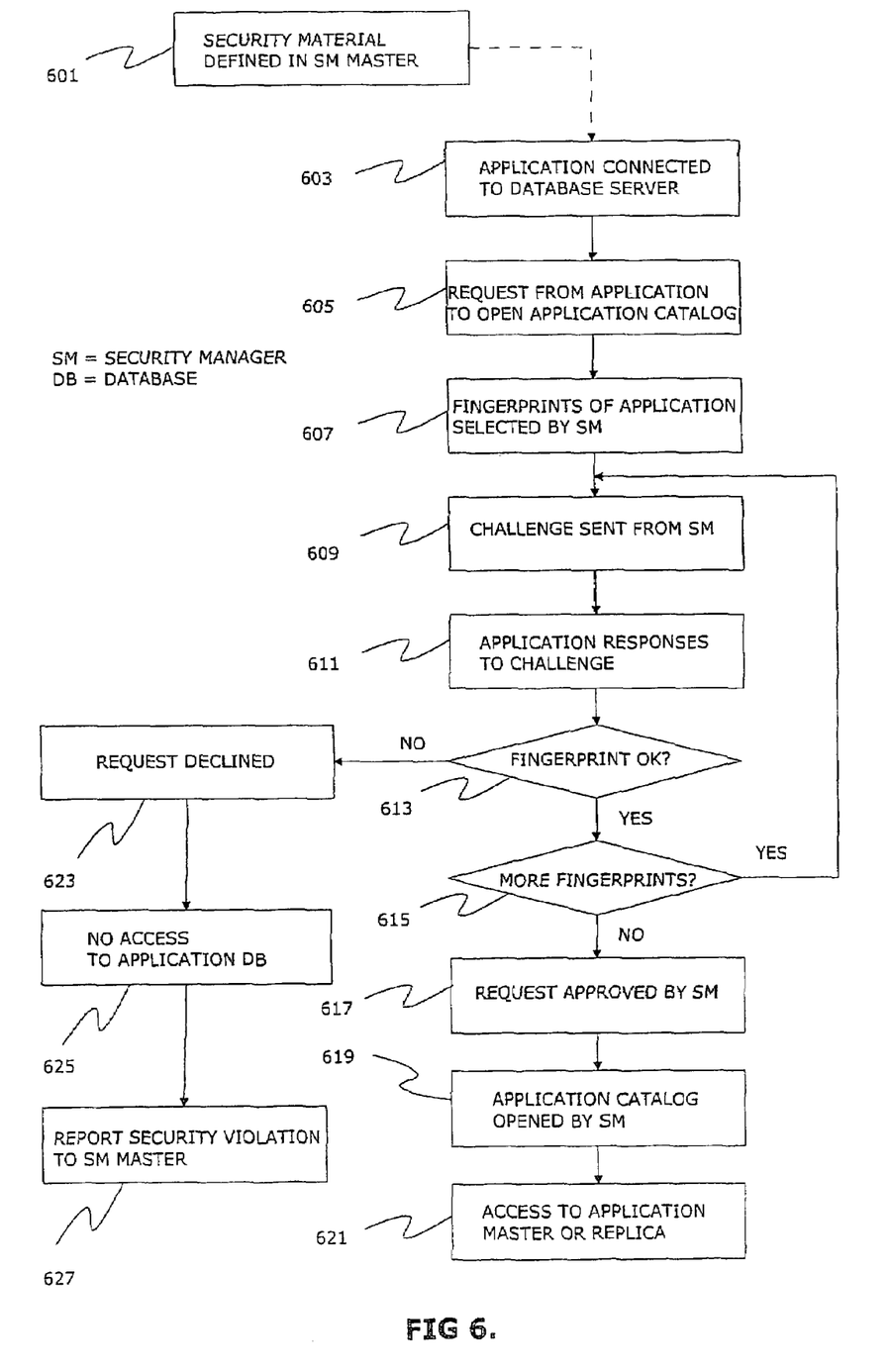
FIG. 6 shows a flow diagram of a method for security management functionality according to still another embodiment of the invention.

FIG. 6 shows a flow diagram of another embodiment of a method according to the invention. This embodiment is a method for opening a locked application database using an application fingerprint. First, step 601 describes how an application fingerprint material is entered to the database system and defined in the Security Manager master database according to the previous embodiment of the invention, which was described in FIG. 5. In step 601, the security material is also distributed to the Security Manager replica database of the application database. The first primary step of FIG. 6 is step 603 where a desired client application program is communicable connected to the database server. In step 605 the application in question requests the Security Manager to open an application master or replica database. When an application wants to access a database, it sends an "open database" request to the server. The server forwards the request to the Security Manager database who manages the security of said application database. Next in step 607 the Security Manager selects an application fingerprint from the database, and as a reply, the Security Manager sends the client application a challenge according to step 609. Then the application responds to said challenge as shown in step 611. Next, in step 613 the Security Manager checks the response sent by the application and makes a decision based on the application fingerprint whether the response is correct or not. If the application is not able to respond to the challenge correctly, next step is step 623 where the request is declined and the access denied to the application database according to step 625. The Security Manager replica may now report the security violation to the Security Manager master database, step 627. In case the response sent by the application is correct, in step 615 it is checked if there are more fingerprints selected by the Security Manager. The Security Manager may require correct response to any number of challenges before it opens the database for the requesting application. If so, the Security Manager sends a new challenge to the client application based on another application fingerprint according to step 609. The loop of steps 609-615 is repeated as many times as there are fingerprints selected by the Security Manager. Finally, when all challenges are responded correctly by the application, the Security Manager approves the request (step 617) and opens the database according to step 619. After this the application may access data of the application master or replica database as shown in step 621.

As an example the following enlists exemplary SQL commands that are needed to implement the use cases described above in accordance with FIG. 4. In this example, the databases within a database server are implemented as database catalogues. Hence, terms "database" and "database catalogue" may be used interchangeably in this example. The role of a database catalogue can be set to be a Security Manager by issuing a command:

ALTER CATALOGUE SET SECURITY MANAGER

A replica Security Manager database catalogue can be registered with the master catalogue using a command:

MESSAGE <msg name> APPEND REGISTER REPLICA <catalogue_name>

An application catalogue can assign a Security Manager for itself with a command:

ALTER CATALOGUE <application_catalogue_name>
    ASSIGN SECURITY MANAGER <manager_catalogue_name>

The application can request the Security Manager to open an application database catalogue with a command:

OPEN CATALOGUE <catalogue_name>

The previous command can return a result set that contains a challenge to which the application needs to respond with a command:

RESPOND CHALLENGE <challenge_id><response_value>

The Security Manager can suspend an application database catalogue, i.e. deny access from any application who tries to open it, with a command:

SUSPEND CATALOGUE <node_name>

The Security Manager can resume access to a catalogue with a command:

RESUME CATALOGUE <node_name>

The Security Manager master can drop all security material of a replica node with a command:

DROP KEYS <node_name>

The security material of an application database catalogue can be refreshed, i.e. changed data sent to the replica, by executing in the security manager replica a command:

MANAGER.SYNCHRONIZE <node_name>

This command can also be used by the Security Manager master database using push synchronization.

An application catalogue unlocking key can be inserted to the Security Manager catalogue with a command:

STORE APPLICATION FINGERPRINT <fingerprint data>
    CHALLENGE <challenge id>
    APPLICATION <application id>
    NODE <replica node name|ALL>

If executed in the Security Manager replica, this command is automatically stored for later propagation to the Security Manager master upon next synchronization.

The unlocking key can be removed from the Security Manager with a command:

DROP APPLICATION FINGERPRINT
    OF CHALLENGE <challenge id>
    APPLICATION <application id>
    NODE <replica node name|ALL>

If executed in the Security Manager replica, this command is automatically stored for later propagation to the Security Manager master.

Figure 7:
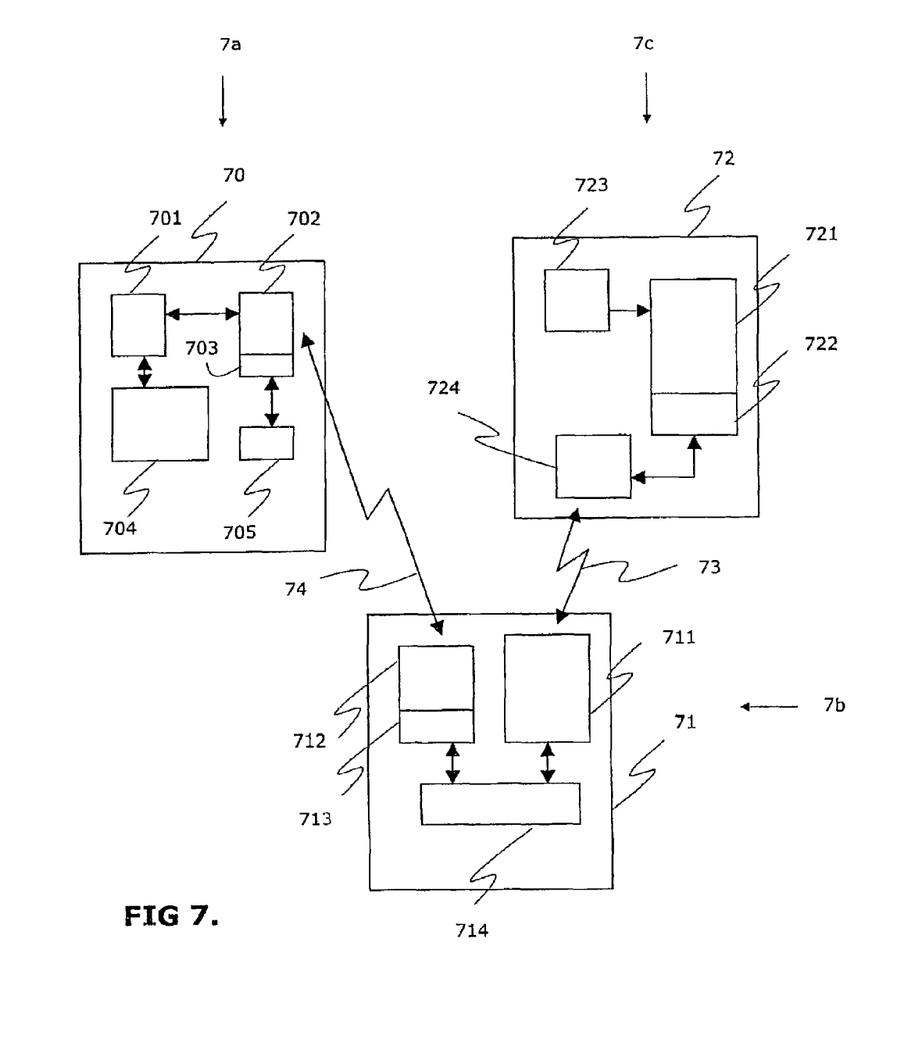
FIG. 7 shows a block diagram of an exemplary arrangement of database servers for managing security material in a distributed database system according to the invention.

FIG. 7 shows a block diagram of an exemplary arrangement of database servers for managing security material in a distributed database system according to the invention. Database servers 7a, 7b, 7c comprise each at least one database 70, 71, 72. The servers are communicably linked to each other by any known suitable datatransfer system 73, 74, such as a wireless or wired network. In this example the database 70 functions as the Security Manager master database. The database 71 of the server 7b functions as the Security Manager replica database. A client application program accesses the database 72 of the server 7c and it is requesting authentication and authorization services to access the application database. According to one embodiment of the invention the databases 71 and 72 may reside in the same server e.g. in this example either in the server 7b or 7c.

The database 70 of the server 7a comprises means for defining 704 and storing 701 Security Manager material and means for distributing 702 Security Manager material to the database 71 of the server 7b. The database 70 also comprises means for synchronizing data 703 in association with means for transmitting (distributing) and receiving data 702 with the database 71. The database 70 also comprises means for a security alert 705 in case of a failure of functionality. The database 71 of the server 7b comprises means for receiving 712 the Security Manager material from the server 7a and in association with receiving means there is means for synchronizing data 713 with the database 70 of the server 7a. The database also comprises means 714 for authenticating applications and authorizing access to application databases in the database system. In addition, the database 71 comprises means for transmitting and receiving data 711 from the database 72 of the server 7c. The database connection 721 is related to client application program wanting to get access to a specified application database resides in the database 72 of the server 7c. A block 722 in association with the connection 721 depicts "application fingerprints" as security material of the application. The database 72 comprises means for transmitting and receiving data 724 from the server 7b. The database 71 of the server 7b uses the application fingerprints 722 of the database 72 of the server 7c to authenticate and authorize client applications to access the database 72. The database 72 also comprises means for logging in 723 to the database server 72 using user-ID and password to get access to unlocked databases. The transmitting and receiving means 711 of the server 7b and transmitting and receiving means 724 of the server 7c communicates via the transfer system 73 for sending a request from the application database 72, for receiving the request by the database 71 and for sending to the application database 72 at least one challenge relating to the Security Manager material, and for responding the challenge by the application database 72. The verification of responses to challenges and approval of the request is done by means for authentication and authorization 714 in the server 7b on the basis of the Security Manager information distributed from the server 7a. In case of a failure to respond a challenge correctly a security alert information is propagated to the security alert means 705 of the server 7a from the transmitting means 712 of the server 7b.

The invention is not restricted to the embodiments described above. While a preferred embodiment of the present invention is disclosed herein for purposes of explanation, numerous changes, modifications, variations, substitutions and equivalents in whole or in part should now be apparent to those skilled in art to which the invention pertains. Accordingly, it is intended that the present invention be limited only the spirit and scope of the hereto appended claims.

Cited Documents

[1] US 2001/0,019,614; Hidden Link Dynamic Key Manager for Use in Computer Systems with Database Structure for Storage and Retrieval of Encrypted Data, Madouk Ashraf

[2] EP 0860788; Intelligent Transaction, Solid Information Technology Oy

The invention claimed is:

1. A method for managing security material in a database system comprising at least one database server, the method comprising steps of:
   in at least one dedicated security management master database, managing security material of said database system, the security material to be used for authentication of a plurality of application databases within the database system through a non-user-identification challenge-response phase;
   in the at least one dedicated security management master database, defining the security material to be used for authentication of a plurality of application databases within the database system, the security material comprising at least some content information derived from contents of an application program having authority to access any of the application databases;
   copying at least a partial copy of data of the dedicated security management master database to at least one dedicated security management replica database to manage at least part of the security material of said database system;
   in the at least one dedicated security management replica database, receiving from an application program an authorization request to access at least one of the application databases;
   sending at least one challenge as a response to the authorization request, the at least one challenge relating to the security material;
   in the at least one dedicated security management replica database, receiving, as a response to the challenge, data produced by the requesting application program using the content information of the application program;
   evaluating the received response to the challenge using the security material; and
   based on the result of the evaluation, authorizing the requesting application program to access the at least one application database or denying the requesting application program from accessing the at least one application database.

2. A method according to claim 1, wherein said dedicated security management replica database exchanges data with said dedicated security management master database using data synchronization techniques.

3. A method according to claim 1, wherein said dedicated security management replica database reports a failed authorization request to said dedicated security management master database.

4. A method according to claim 1, wherein application's access to said application database is denied until said dedicated security management replica database authorizes access to said application database.

5. A method according to claim 1, wherein said dedicated security management replica database and said application database is managed by a same database server.

6. A method according to claim 1, wherein said dedicated security management replica database and said application database is managed by different database servers.

7. A method according to claim 1, wherein said challenge is related to at least one digital signature residing within said application program.

8. A method according to claim 1, wherein said dedicated security management replica database sends at least a second challenge to said application program upon receipt of said response.

9. A method according to claim 1, wherein said application database is a replica database whose master database is managed by a database server different from the database server managing said dedicated security management master database.

10. A system for managing security material in a database system comprising at least one database server, the system comprising:
   at least one dedicated security management master database arranged to manage security material of said database system, the security material to be used for authentication of a plurality of application databases within the database system through a non-user-identification challenge-response phase;
   the at least one dedicated security management master arranged to define the security material with the security material comprising at least some content information derived from contents of an application program having authority to access any of the application databases;
   at least one dedicated security management replica database arranged to copy at least a partial copy of data of the dedicated security management master database to manage at least part of the security material of said database system;
   the at least one dedicated security management replica database arranged to receive from an application program an authorization request to access at least one of the application databases;
   the at least one dedicated security management replica database arranged to send at least one challenge as a response to the authorization request, the at least one challenge relating to the security material;

the at least one dedicated security management replica database arranged to receive as a response to the challenge data produced by the requesting application program using the content information of the application program;

the at least one dedicated security management replica database arranged to evaluate the received response to the challenge using the security material; and based on the result of the evaluation, the requesting application program is authorized or unauthorized to access the at least one application database.

11. The method of claim 1, wherein, the content information derived from the contents of the application program, used as the security material during the challenge-response phase of the authentication, comprises an application fingerprint of the application program.

12. The method of claim 11, wherein, the application fingerprint of the application program is one of i) an electronically signed hash value of the application program file and ii) an electronically signed hash value of a part of the application program file.

13. The method of claim 12, wherein, the content information derived from the contents of the application program, used as the security material during the challenge-response phase of the authentication, comprises an application fingerprint of the application program.

14. The method of claim 13, wherein, the application fingerprint of the application program is one of i) an electronically signed hash value of the application program file and ii) an electronically signed hash value of a part of the application program file.

15. The method of claim 13, wherein, the application fingerprint of the application program is the size of the application program file.

16. The method of claim 13, wherein, the application fingerprint of the application program is the application program's capability to correctly perform a certain function upon request.

17. The method of claim 11, wherein, the application fingerprint of the application program is the size of the application program file.

18. The method of claim 11, wherein, the application fingerprint of the application program is the application program's capability to correctly perform a certain function upon request.

19. A system according to claim 10, wherein said dedicated security management replica database is arranged to exchange data with said dedicated security management master database using data synchronization techniques.

20. A system according to claim 10, wherein said dedicated security management replica database is arranged to report a failed authorization request to said dedicated security management master database.

21. A system according to claim 10, wherein application's access to said application database is denied until said dedicated security management replica database authorizes access to said application database.

22. A system according to claim 10, wherein a same database server is arranged to manage said dedicated security management replica database and said application database.

23. A system according to claim 10, wherein different database servers are arranged to manage said dedicated security management replica database and said application database.

24. A system according to claim 10, wherein said application program is arranged to reside at least one digital signature relating to said challenge.

25. A system according to claim 10, wherein said dedicated security management replica database is arranged to send at least one second challenge to said application program upon receipt of said response.

26. A system according to claim 10, wherein said application database is arranged to be a replica database whose master database is managed by a database server different from the database server managing said dedicated security management master database.

27. The method of claim 10, wherein, the content information derived from the contents of the application program, used as the security material during the challenge-response phase of the authentication, comprises an application fingerprint of the application program.

28. The method of claim 27, wherein, the application fingerprint of the application program is one of i) an electronically signed hash value of the application program file and ii) an electronically signed hash value of a part of the application program file.

29. The method of claim 27, wherein, the application fingerprint of the application program is the size of the application program file.

30. The method of claim 27, wherein, the application fingerprint of the application program is the application program's capability to correctly perform a certain function upon request.

31. A computer readable medium having computer executable program code arranged to cause a computer to perform at least steps of:

managing in at least one dedicated security management master database security material of a database system, the security material to be used for authentication of a plurality of application databases within the database system through a non-user-identification challenge-response phase;

defining in at least one dedicated security management master database the security material to include at least some content information derived from contents of an application program having authority, to access any of the application databases;

copying at least a partial copy of data of the dedicated security management master database to at least one dedicated security management replica database to manage at least part of security material of said database system;

receiving in the at least one dedicated security management replica database from an application program an authorization request to access at least one of the application databases;

sending at least one challenge as a response to the authorization request, the at least one challenge relating to the security material;

receiving in the at least one dedicated security management replica database as a response to the challenge data produced by the requesting application program using the content information of the application program;

evaluating the received response to the challenge using the security material; and based on the result of the evaluation, authorizing the requesting application program to access the at least one application database or denying the requesting application program from accessing the at least one application database.

* * * * *